(12) United States Patent
Santoso et al.

(10) Patent No.: US 11,651,558 B2
(45) Date of Patent: May 16, 2023

(54) SYSTEM AND METHOD FOR PROVIDING VIRTUAL SPACE TOUR

(71) Applicant: 3i Inc., Daegu (KR)

(72) Inventors: Kevin Nathanael Santoso, Seoul (KR); Ken Kim, Seoul (KR); Ji Wuck Jung, Gyeonggi-do (KR)

(73) Assignee: 3I INC., Daegu (KR)

( * ) Notice: Subject to any disclaimer, the term of this patent is extended or adjusted under 35 U.S.C. 154(b) by 0 days.

(21) Appl. No.: 17/547,195

(22) Filed: Dec. 9, 2021

(65) Prior Publication Data

US 2023/0113206 A1 Apr. 13, 2023

(30) Foreign Application Priority Data

Oct. 8, 2021 (KR) .................. 10-2021-0134208

(51) Int. Cl.
*G06F 3/01* (2006.01)
*G06F 3/048* (2013.01)
*G06T 19/00* (2011.01)
*G06F 3/04845* (2022.01)
*H04L 67/131* (2022.01)

(52) U.S. Cl.
CPC ............ *G06T 19/003* (2013.01); *G06F 3/011* (2013.01); *G06F 3/04845* (2013.01); *H04L 67/131* (2022.05)

(58) Field of Classification Search
CPC .......... G06F 3/011; G06F 3/016; G06F 3/017; G06F 3/0426; G06F 3/0428; G06F 3/04845; G06T 19/003; H04L 67/131
See application file for complete search history.

(56) References Cited

U.S. PATENT DOCUMENTS

| | | | |
|---|---|---|---|
| 10,139,985 B2* | 11/2018 | Mildrew | G06F 3/04817 |
| 2008/0126206 A1* | 5/2008 | Jarrell | G06Q 30/0239 |
| | | | 705/14.66 |
| 2013/0135479 A1* | 5/2013 | Bregman-Amitai | |
| | | | G11B 27/034 |
| | | | 348/158 |
| 2018/0165854 A1* | 6/2018 | Du | G06T 11/00 |
| 2021/0248674 A1* | 8/2021 | Ogunbunmi | G06Q 50/16 |
| 2021/0283496 A1* | 9/2021 | Mandella | A63F 13/5255 |
| 2022/0269885 A1* | 8/2022 | Wixson | G06V 10/82 |
| 2022/0269888 A1* | 8/2022 | Stoeva | G06V 10/82 |
| 2022/0317859 A1* | 10/2022 | Jagannathan | G06T 17/00 |

FOREIGN PATENT DOCUMENTS

KR 10-2121107 6/2020

* cited by examiner

*Primary Examiner* — Vijay Shankar
(74) *Attorney, Agent, or Firm* — Ladas & Parry, LLP (57) ABSTRACT

Provided is a system and method for providing a virtual space tour, the system including: a plurality of user terminals; and a server configured to provide a virtual space corresponding to a real indoor space to the plurality of user terminals, to receive a plurality of pieces of motion data from the user terminals, to generate a plurality of motion objects corresponding to the plurality of pieces of motion data, and to generate user's tour information based on the plurality of pieces of motion data, wherein the virtual space includes 360-degree images provided at a plurality of points in the real indoor space, and the plurality of user terminals configured to be independently operated in the virtual space at a same point or different points based on the virtual space and individually generate motion data in response to a user manipulation input.

17 Claims, 12 Drawing Sheets

SYSTEM AND METHOD FOR PROVIDING VIRTUAL SPACE TOUR

CROSS-REFERENCE TO RELATED APPLICATION

This application is based on and claims priority under 35 U.S.C. § 119 to Korean Patent Application No. 10-2021-0134208, filed on Oct. 8, 2021, in the Korean Intellectual Property Office, the disclosure of which is incorporated by reference herein in its entirety.

BACKGROUND

1. Field

One or more embodiments relate to a system and method for providing a virtual space tour.

2. Description of the Related Art

As Virtual Reality (VR) or Augmented Reality (AR) has been developed, recently, a virtual space has been utilized in many applications.

The most used application is a virtual space tour or virtual place tour inside a building, which is implemented to be similar to the real thing. Users indirectly experience places that are difficult to visit directly so that users' convenience has been improved.

In addition to a simple tour of the virtual space, a virtual space guide is provided to new users that visit a place for the first time so that a new user's use inconvenience is reduced and various functions that allow a plurality of users to share a virtual space have been developed.

However, when the plurality of users share the virtual space tour, the same virtual space is provided to each user, so it is difficult for each user to actually see a desired space in the virtual space to be toured.

In addition, even if each user tours a desired space within the same virtual space, there is a limitation in providing other users with information on the currently toured virtual space.

PRIOR ART DOCUMENTS

Patent Documents

Korean Patent Registration No. 10-2121107

SUMMARY

One or more embodiments include a system and method for providing a virtual space tour, wherein a plurality of user terminals provided with the same virtual space as a real indoor space may be independently operated at the same point or different points and user's tour information from one of the plurality of user terminals is provided to another user terminal or the operation of other user terminals is controlled by setting a sharing mode of any one user.

The problems of the present application are not limited to the problems mentioned above, and other unmentioned problems will be clearly understood by those skilled in the art from the following description.

Additional aspects will be set forth in part in the description which follows and, in part, will be apparent from the description, or may be learned by practice of the presented embodiments of the disclosure.

According to one or more embodiments, there is provided a system for providing a virtual space tour. The system for providing a virtual space tour may include a plurality of user terminals, and a server configured to provide a virtual space corresponding to a real indoor space to the plurality of user terminals, to receive a plurality of pieces of motion data from the user terminals, to generate a plurality of motion objects corresponding to the plurality of pieces of motion data and to generate user's tour information based on the plurality of pieces of motion data, wherein the virtual space includes 360-degree images provided at a plurality of points in the real indoor space, and the plurality of user terminals are configured to being independently operated in the virtual space at a same point or different points based on the virtual space, and individually generate motion data in response to user manipulation input.

According to one or more embodiments, there is provided a method of providing a virtual space tour. The method of providing a virtual space tour, the method being performed by a server, may include providing a virtual space corresponding to a real indoor space to a plurality of user terminals, receiving a plurality of pieces of motion data from a user terminal, generating a plurality of motion objects corresponding to the plurality of motion data, and generating user's tour information based on the plurality of motion objects, wherein the virtual space includes 360-degree images provided at a plurality of points in the real indoor space, and the plurality of user terminals are configured to being independently operated in the virtual space at a same point or different points based on the virtual space, and individually generate motion data in response to user manipulation input.

According to one or more embodiments, there is provided a storage medium. The storage medium may be a storage medium on which computer-readable instructions are stored. When a server is operated by a system for providing an omnidirectional image tour, the computer-readable instructions may allow the server to perform operations of providing a virtual space corresponding to a real indoor space to a plurality of user terminals, receiving a plurality of pieces of motion data from the plurality of user terminals, generating a plurality of motion objects corresponding to the plurality of motion data, and generating user's tour information based on the plurality of motion objects, wherein the plurality of user terminals are configured to being independently operated in the virtual space at a same point or different points based on the virtual space and individually generate motion data in response to user manipulation input.

Means for solving the above problems do not enumerate all the features of the present application. Various means for solving the problems of the present application may be understood in more detail with reference to specific embodiments of the detailed description below.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Hereinafter, embodiments of the present disclosure will be described with reference to the accompanying drawings.

However, the embodiments of the present application may be modified in various other forms, and the scope of the present application is not limited to the embodiments described below. In addition, the embodiments of the present application are provided in order to more completely describe the present application to a person having ordinary knowledge in the art.

Various embodiments of the present application and terms used therein are not intended to limit the technical features described in the present application to specific embodiments, and should be understood to include various modifications, equivalents, or substitutions of the embodiments. With respect to the description of the drawings, like reference numerals may be used for similar to related components. The singular form of a noun corresponding to an item may include one or more of the item, unless the relative context clearly dictates otherwise. In the present application, each of phrases such as "A or B," "at least one of A and B," "at least one of A or B," "A, B or C," "at least one of A, B, and C," and "at least one of A, B or C" may include any one of items listed together with a corresponding phrase of the phrases, or all possible combinations thereof. It will be understood that the terms "first", "second", etc. may be used herein to simply distinguish a corresponding component from other components and do not limit corresponding components in another aspect (for example, importance or order). It will be understood that when a (e.g., a first) component is referred to as being "coupled to," "connected to," or "linked with" other (e.g., a second) component with or without the term "functionally" or "communicatively", the component may be directly connected to the other component or may be connected to the other component through a third component.

The term "module" used herein means at least one function or operation, and may be implemented as hardware or software, or a combination of hardware and software.

Various embodiments of the present application include software (e.g., a program) including one or more instructions stored in a storage medium readable by a machine—for example, a user terminal 100 or a computing device 300. For example, the processor 301 may call at least one of the one or more instructions stored from the storage medium and execute the at least one instruction. This enables the device to be operated to perform at least one function according to the called at least one instruction. The one or more instructions may include codes generated by a compiler or codes executable by an interpreter. The device-readable storage medium may be provided in the form of a non-transitory storage medium. Here, 'non-transitory' refers to a device in which the storage medium is tangible and signals (e.g., electromagnetic waves) are not included, and this term does not distinguish between a case in which data is semi-permanently stored in a storage medium and a case in which data is temporarily stored.

According to an embodiment, a method according to various embodiments disclosed in the present application may be provided by being included in a computer program product. The computer program product may be traded between sellers and buyers as commodities. The computer program product may be distributed in the form of a machine-readable storage medium (e.g., compact disc read only memory (CDROM)), or via an application store (e.g., Play Store™) or may be distributed (e.g., downloaded or uploaded) directly, online between two user devices (e.g., smartphones). In the case of online distribution, at least a part of the computer program product may be temporarily stored or temporarily created in a machine-readable storage medium such as a memory of a server of a manufacturer, a server of an application store, or a relay server.

According to various embodiments, each component (e.g., a module or a program) of the above-described components may include a singular or a plurality of entities. According to various embodiments, one or more components or operations among the above-described corresponding components may be omitted, or one or more other components or operations may be added. Alternatively or additionally, a plurality of components (e.g., a module or a program) may be integrated into one component. In this case, the integrated component may perform one or more functions of each component of the plurality of components identically or similarly to those performed by the corresponding component among the plurality of components prior to the integration. According to various embodiments, operations performed by a module, program, or other component are executed sequentially, in parallel, repeatedly, or heuristically, or one or more of the operations are executed in a different order, omitted, or one or more other operations may be added.

Although various flowcharts are disclosed to describe the embodiments of the present application, this is for convenience of description of each step, and each step is not necessarily performed according to the order of the flowchart. That is, each step in the flowchart may be performed simultaneously with each other, performed in an order according to the flowchart, or may be performed in an order opposite to the order in the flowchart.

Figure 1:
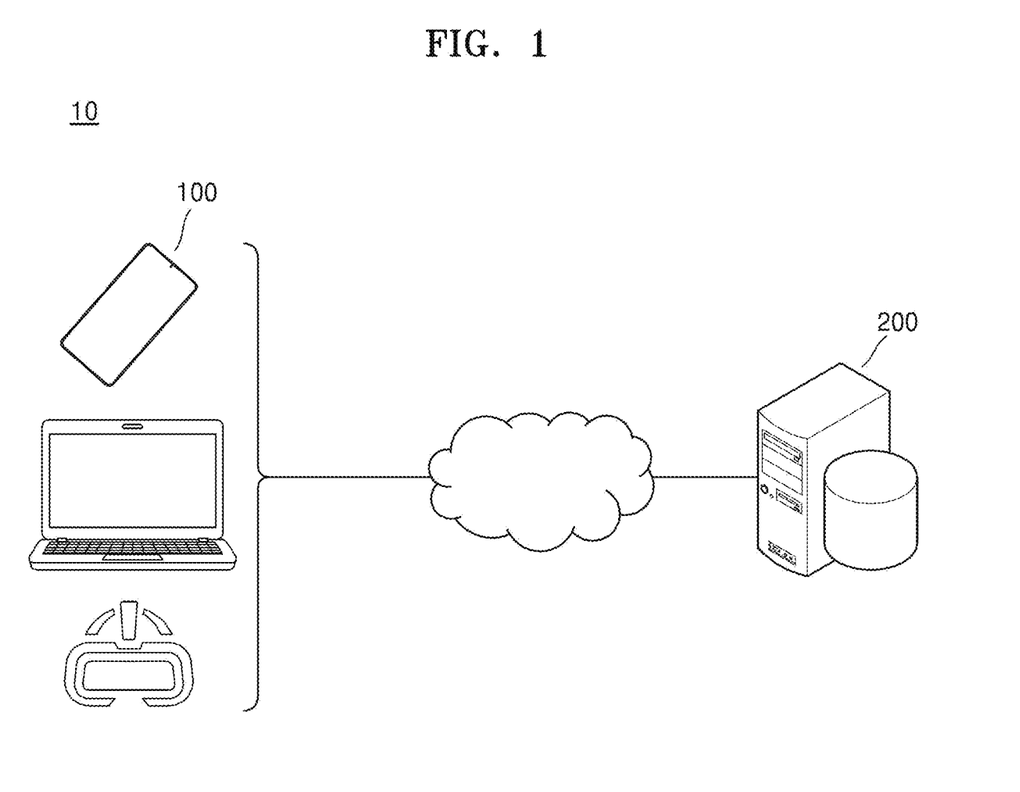
FIG. 1 is an example of a view for describing a virtual space tour system according to an embodiment.
Figure 2A:
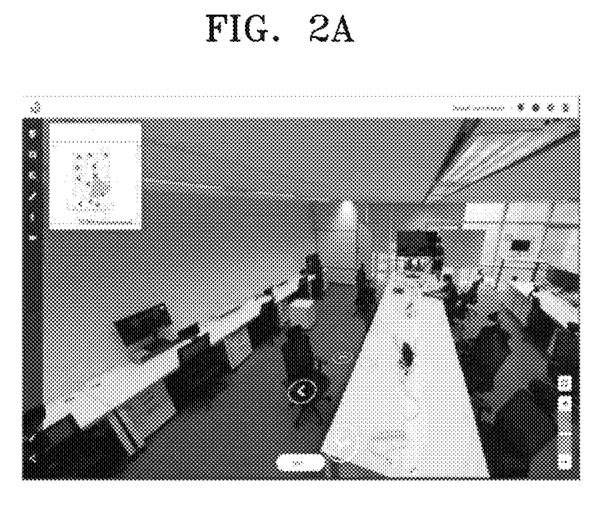
FIGS. 2A and 2B are example of views for describing a virtual space provided to a plurality of user terminals according to an embodiment.
Figure 2B:
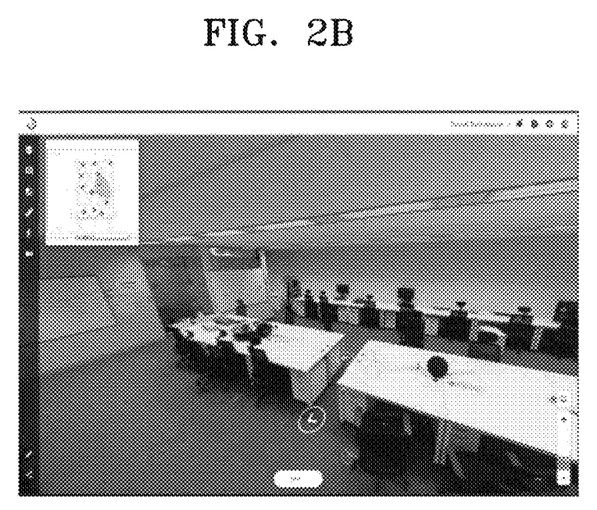

FIG. 1 is an example of a view for describing a virtual space tour system according to an embodiment, and FIG. 2 is an example of a view for describing a virtual space provided to a plurality of user terminals according to an embodiment.

Referring to FIG. 1, a system 10 for providing a virtual space tour may include a plurality of user terminals 100 and a server 200.

Each of the plurality of user terminals 100 may be an electronic device that a user may use to access the computing device 300, for example, a mobile phone, a smartphone, a laptop computer, a digital broadcasting terminal, a personal digital assistants (PDA), a portable multimedia player (PMP), a navigation device, a personal computer (PC), a tablet PC, an ultrabook, a wearable device (e.g., a watch-type terminal (smartwatch), a glass-type terminal (smart glass), head mounted display (HMD), etc. However, besides, each user terminal 100 may include an electronic device used in Virtual Reality (VR) or Augmented Reality (AR).

The server 200 may provide a virtual space corresponding to a real indoor space to the plurality of user terminals 100.

In this case, the virtual space may include 360-degree images provided at a plurality of points.

The 360-degree images provided at a plurality of points are images captured in several positions of the real indoor space. A user of the plurality of user terminals 100 may independently operate the plurality of user terminals 100 at the same point or different points of a plurality of points based on the 360-degree images.

For example, FIGS. 2A and 2B show output screens at different points selected by each user in the virtual space provided to the plurality of user terminals 100, and each user may independently operate the plurality of user terminals 100 according to use and conveniences.

It may be checked that the plurality of points are displayed on the drawing of the virtual space. The user may select the displayed points to manipulate the viewing range and direction of the virtual space output on the screen, and each of these manipulations may be generated as individual motion data.

Furthermore, the server 200 may receive a plurality of motion data from the plurality of user terminals 100 and may generate a plurality of motion objects corresponding to the plurality of motion data. Also, the user's tour information may be generated based on the plurality of motion objects.

The motion objects may include at least one of a starting point, an ending point, a sharing mode, and manipulation data, which are received from the plurality of user terminals 100.

The starting point or the ending point may be a point arbitrarily selected by the user from the 360-degree image output by the plurality of user terminals 100.

For example, in the 360-degree image, the user may perform an operation such as clicking a departure point as a starting point for a virtual space tour, and clicking an arrival point as an ending point.

When the starting point and the ending point are manipulated in this way, the user terminal 100 may generate the starting point and the ending point as motion data and may transmit the generated motion data to the server 200.

However, because this is only an example for carrying out the present invention, motion data at several points may be generated by clicking a plurality of intermediate points on the screen where the user is output in addition to the starting point and the ending point.

The sharing mode may target at least two user terminals among the plurality of user terminals 100.

When the sharing mode is set for at least two user terminals, a sharing control authority may be set for one user terminal of at least two users, and the sharing control authority may be blocked for the other user terminal of the at least two user terminals.

Manipulation data may include motion data generated according to each user's manipulation in the virtual space provided to the plurality of user terminals 100.

For example, the manipulation data may include the user's manipulation of clicking the viewing range, the direction, the starting point and the ending point of the virtual space output to the user terminal 100.

Furthermore, the manipulation data may include tour execution of the virtual space including a motion object, interruption during execution, image manipulation at an interruption point, and tour reproduction manipulation after interruption.

Figure 3:
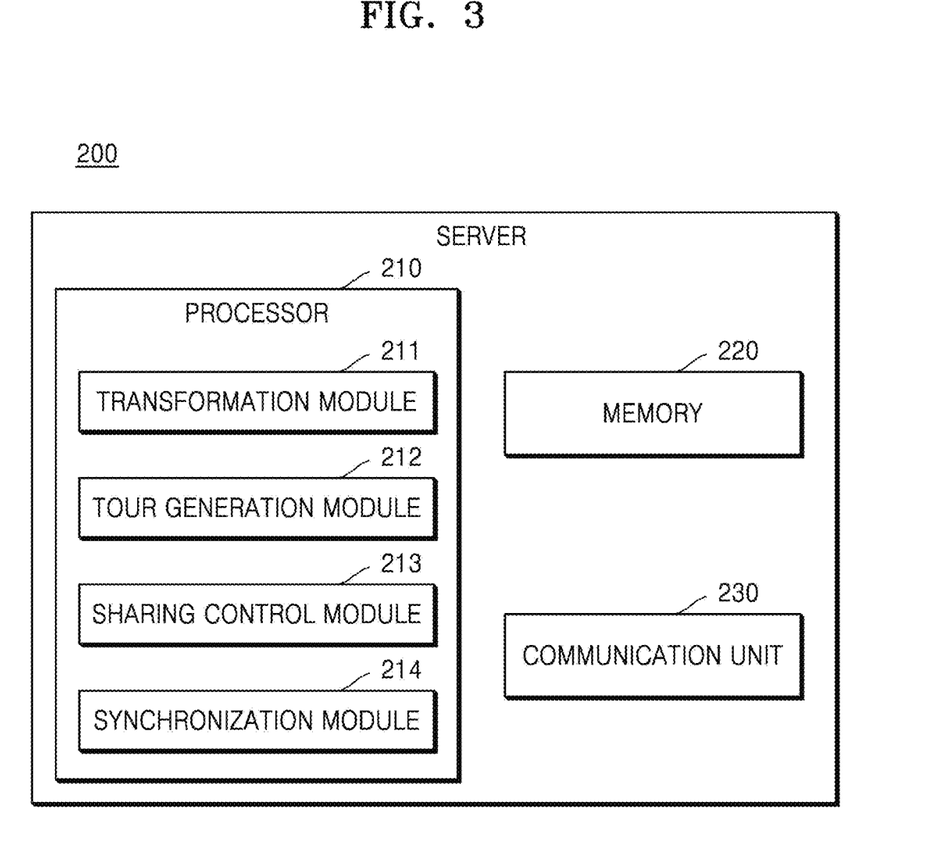
FIG. 3 is a block configuration diagram for describing a server according to an embodiment.

FIG. 3 is a block diagram for describing a server according to an embodiment.

Referring to FIG. 3, the server 200 may include a processor 210, a memory 220, and a communication unit 230.

The processor 210 may include a transformation module 211, a tour generation module 212, a sharing control module 213, and a synchronization module 214.

The transformation module 211 may transform a plurality of motion data into motion object when the plurality of motion data are received from the plurality of user terminals 100.

As described above, the plurality of motion data may be data generated by user manipulation in the virtual space provided to the user terminal 100.

The motion object generated in this way may be generated by the tour generation module 212 as user's tour information.

When the user's tour information is generated, the server 200 may transmit the user's tour information to any one of the plurality of user terminals 100, and the user terminals 100 that receives the user's tour information may execute virtual space tour execution, interruption during execution, image manipulation at the interruption point, and tour reproduction after interruption in the user's tour information including the motion object.

As described above, when the sharing mode is set for at least two user terminals among the plurality of user terminals 100, the sharing control module 213 may set a sharing control authority for any one of the at least two user terminals, and may block the sharing control authority for the user terminal, which is the other one of the user terminals.

At this time, in at least two user terminals for which the sharing mode is set by the synchronization module 214, the virtual space of the user terminal for which the sharing control authority is set is synchronized with the user terminal of which the sharing control authority is blocked, so that a virtual space tour may be provided.

The memory 220 may store a program for processing and controlling the processor 210, and may store data input to or output from the server 200. In an example, the memory 220 may include at least one type memory of a flash memory type, a hard disk type, a multimedia card micro type, a card type memory (e.g., a Secure Digital (SD) or eXtreme Digital (XD) memory, or the like), Random Access Memory (RAM), Static Random Access Memory (SRAM), Read-Only Memory (ROM), Electrically Erasable Programmable Read-Only Memory (EEPRMO), Programmable Read-Only Memory (PROM), a magnetic memory, a magnetic disk, and an optical disk.

The communication unit 230 may include one or more modules that enable communication between the server 200 and another electronic device, for example, the user terminal 100 or the server 200, or communication between the server 200 and a network in which another electronic device is located.

Figure 4:
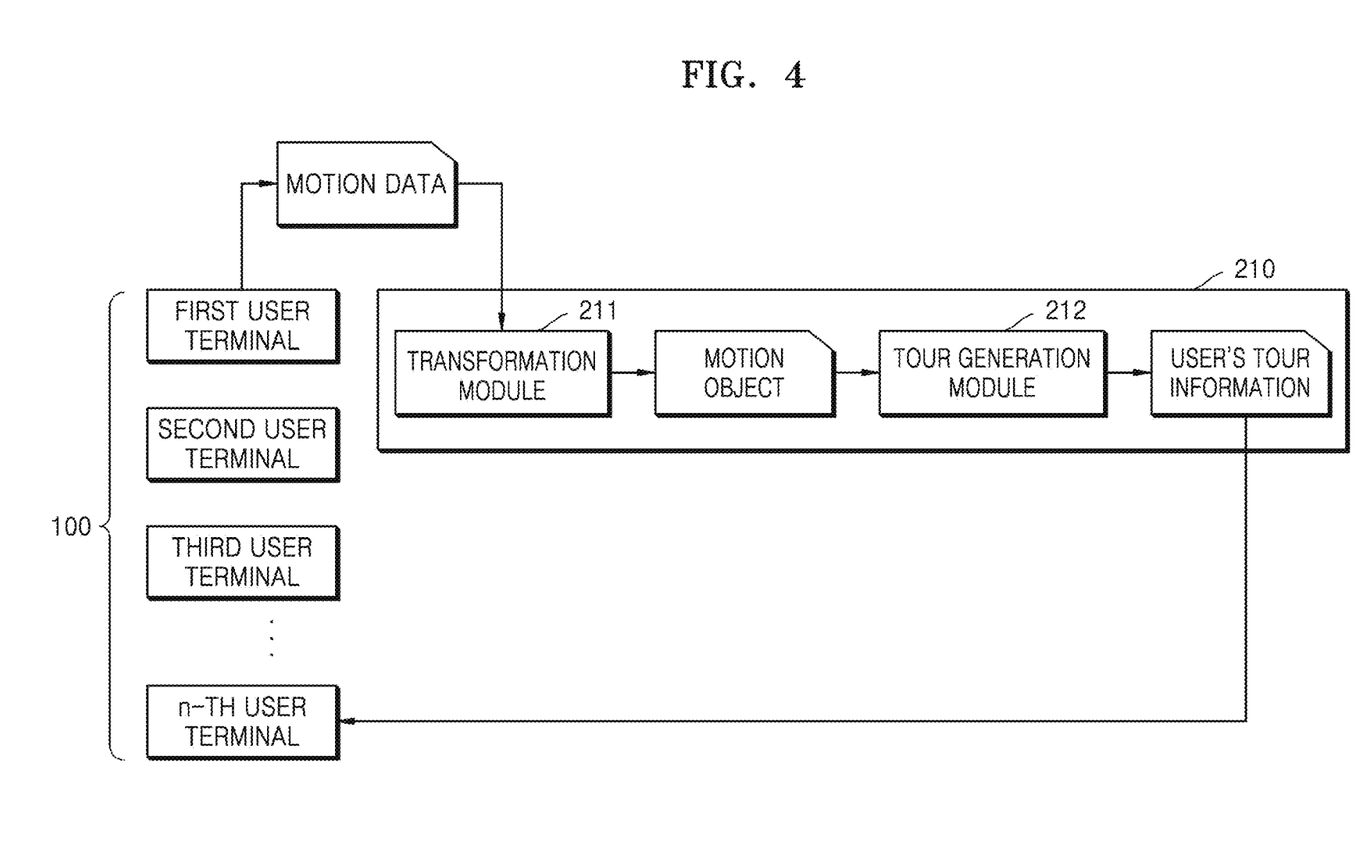
FIG. 4 is a view for describing an architecture for generating user's tour information according to an embodiment.
Figure 5:
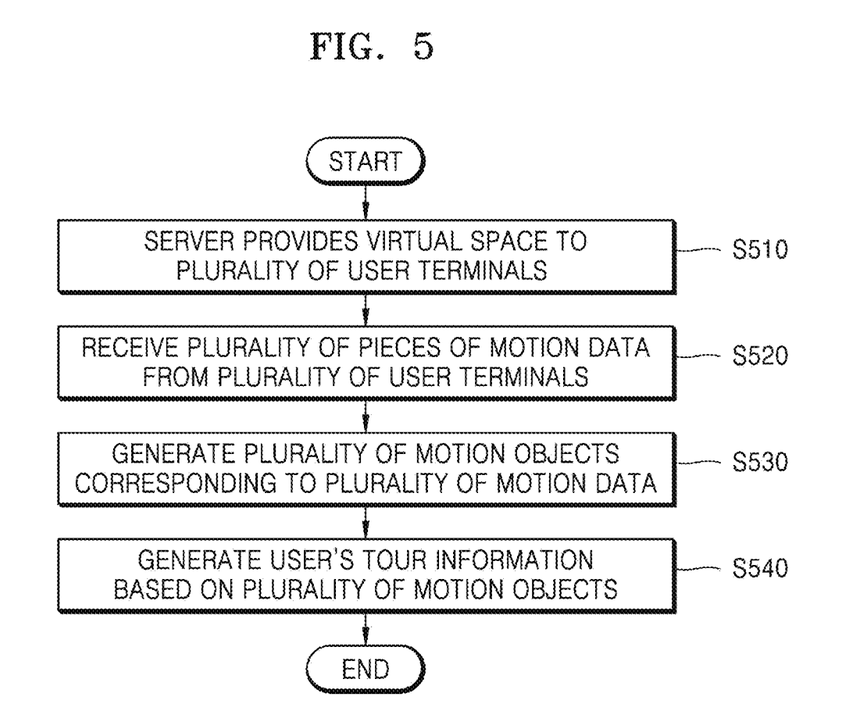
FIG. 5 is a view for describing a method of generating user's tour information according to an embodiment.

FIG. 4 is a view for describing an architecture for generating user's tour information according to an embodiment, and FIG. 5 is a view for describing a method of generating user's tour information according to an embodiment.

Referring to FIGS. 4 and 5, the plurality of user terminals 100 may generate motion data and may transmit the motion data to the server 200. The server 200 may receive the motion data and may generate a motion object by using the transformation module 211 of the processor 210.

First, the server 200 may provide the virtual space including the 360-degree image provided at the plurality of points to the plurality of user terminals (S510).

Then, the server 200 may receive a plurality of motion data from the plurality of user terminals 100 (S520).

For example, the plurality of user terminals 100 may generate a viewing range, a direction, a starting point, an ending point, a sharing mode, and manipulation data of the virtual space output on the screen as a plurality of pieces of motion data based on the virtual space provided by the server 200, and the server 200 may receive the plurality of pieces of motion data.

The server 200 may generate the plurality of pieces of motion data received in this way as a plurality of motion objects (S530) and may generate user's tour information based on the plurality of motion objects (S540).

For example, the transformation module 211 may transform the motion data received from the plurality of user terminals 100 into a motion object, and the tour generation module 212 may generate user's tour information based on the motion object.

As for the user's tour information, when a starting point and an ending point are selected by the user at the user terminals 100, an image guided in the virtual space from the starting point to the ending point may be provided as the user's tour information.

Figure 6:
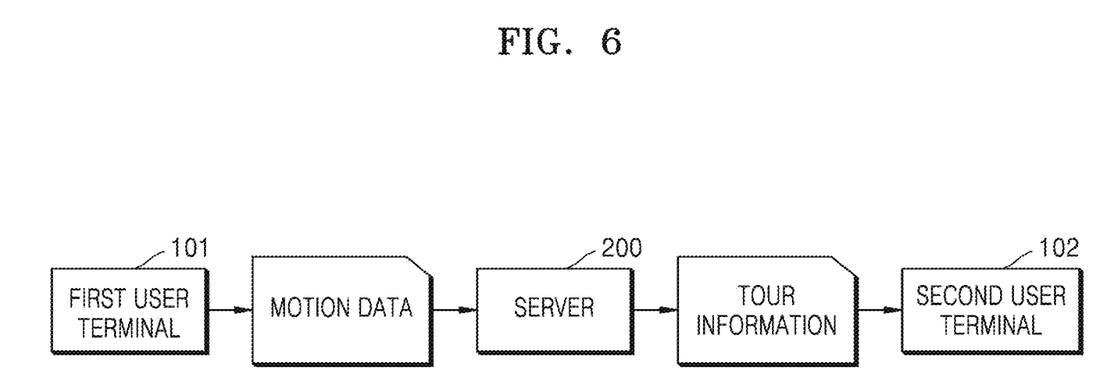
FIGS. 6, 7A and 7B are examples of views for describing an example of FIG. 5.
Figure 7A:
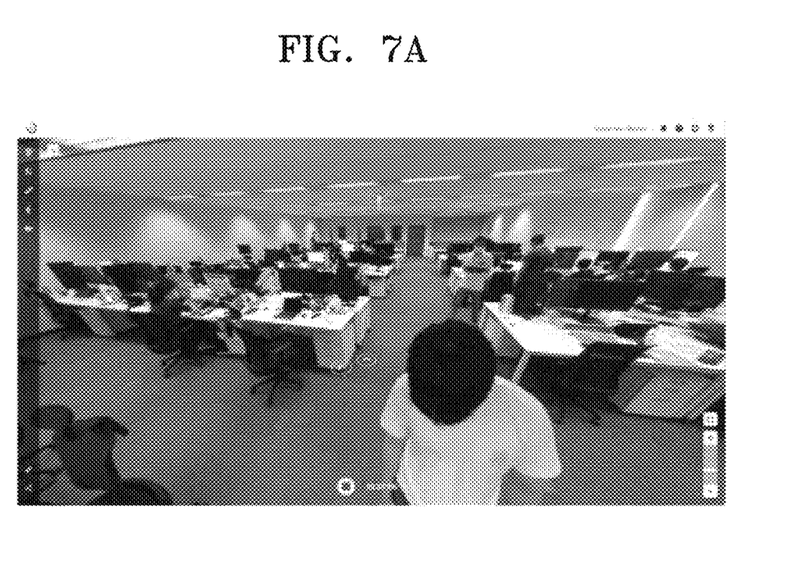
Figure 7B:
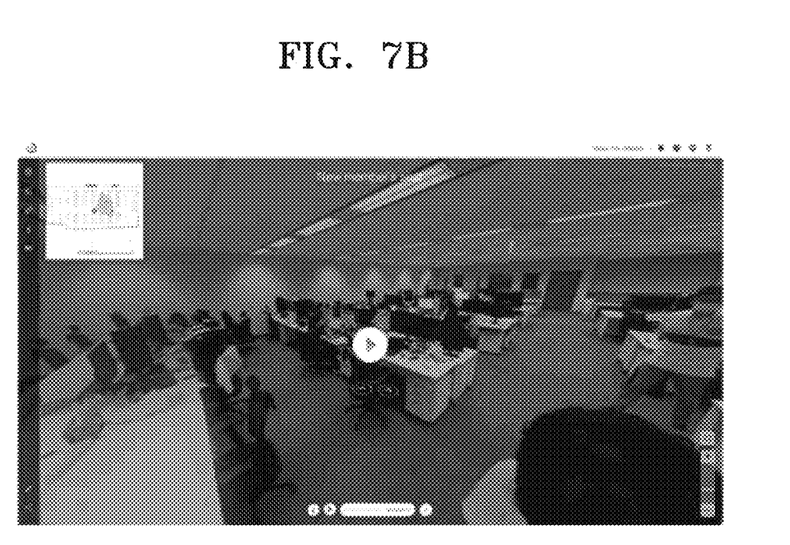

FIGS. 6, 7A and 7B are examples of views for describing an example of FIG. 5.

Referring to FIGS. 6, 7A and 7B, the motion data received from a first user terminal 101 among the plurality of user terminals 100 may be generated as the user's tour information in the server 200 and may be transmitted to a second user terminal 102.

Here, the user's tour information may be a virtual space tour image generated based on the motion data received from the first user terminal 101.

As shown in FIG. 7A, based on the virtual space output on the screen of the first user terminal 101, the first user terminal 101 may select a point where a tour starts in the virtual space and an ending point thereof and may manipulate the viewing range, the direction and the like of the virtual space output on the screen, thereby generating a plurality of pieces of motion data corresponding thereto.

The plurality of pieces of motion data may be generated as the user's tour information in the server 200 and may be generated as the virtual space tour image shown in FIG. 7B.

Figure 8:
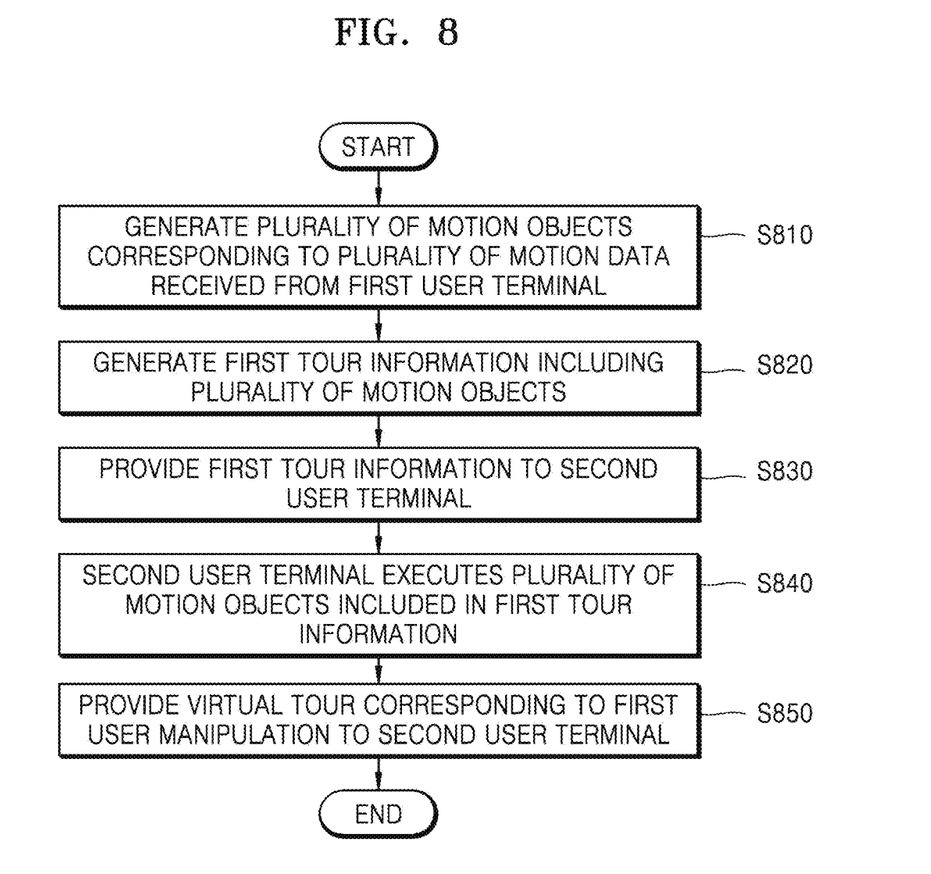
FIGS. 8 and 9 are views for describing that first tour information in which a motion object of a first user terminal is included, is executed by a second user terminal according to an embodiment.
Figure 9:
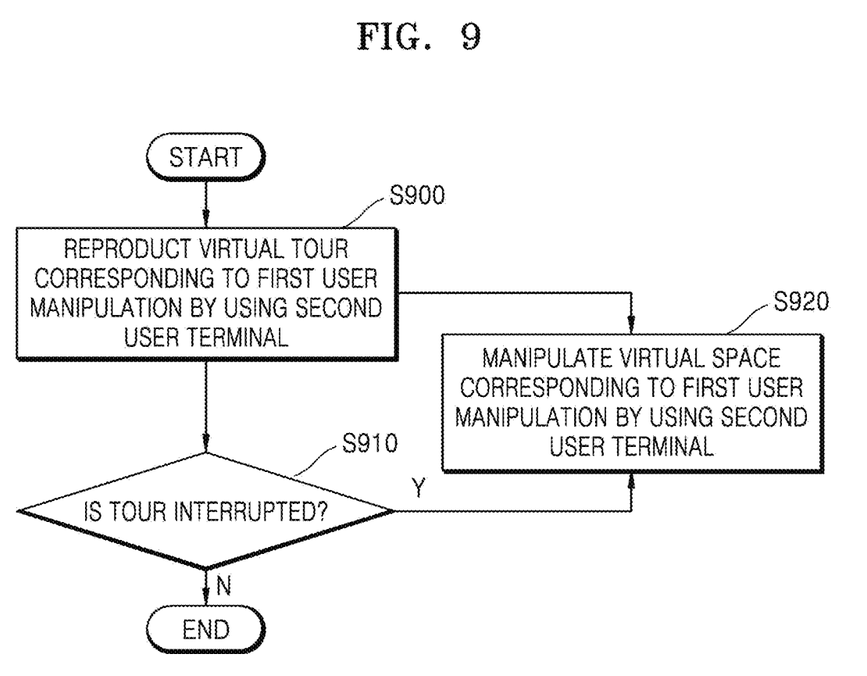

FIGS. 8 and 9 are views for describing that first tour information in which a motion object of a first user terminal is included, is executed by a second user terminal according to an embodiment.

Referring to FIG. 8, in another embodiment, the server 200 may generate a plurality of motion objects corresponding to the plurality of pieces of motion data received from the first user terminal 101 (S810), and may generate first tour information including the plurality of motion objects (S820).

The first tour information generated in this way may be provided to the second user terminal 102 (S830), and the second user terminal 102 may execute the plurality of motion objects included in the first tour information (S840) so that the virtual space tour corresponding to the first user's manipulation may be provided to the second user (S850).

Here, the first tour image may be a plurality of pieces of motion data generated according to the user's manipulation in the virtual space output on the screen of the first user terminal 101. As described above, the plurality of pieces of motion data may be transformed into a motion object in the server 200 and may be generated as the user's tour information.

The second user terminal 101 that receives the first tour image may execute a plurality of motion objects included in the first tour information.

In addition, after the plurality of motion objects being executed are interrupted, the image may be manipulated according to the user's use and conveniences of the second user terminal 102 on the first tour image at the interruption point.

For example, image manipulation may include manipulation in which the user of the second user terminal 102 arbitrarily selects a point and tours the virtual space output on the screen of the second user terminal 102 at the time when the first tour image is interrupted.

When the interrupted first tour image is reproduced again, a tour may be reproduced from the interrupted image.

In other words, the first user terminal that receives the first tour image may provide at least one function of execution of the plurality of motion objects included in the first tour image, interruption during execution, image manipulation at the interruption point, and tour reproduction after interruption.

Referring to FIG. 9, the second user terminal may reproduce a virtual tour corresponding to the first user manipulation by using the generated first tour image (S900), and may determine whether the first tour image is interrupted (S910).

If the first tour image is interrupted, the second user terminal may manipulate the virtual space corresponding to the first user manipulation (S920). Conversely, the virtual tour may be reproduced without interrupting the first tour image.

Figure 10A:
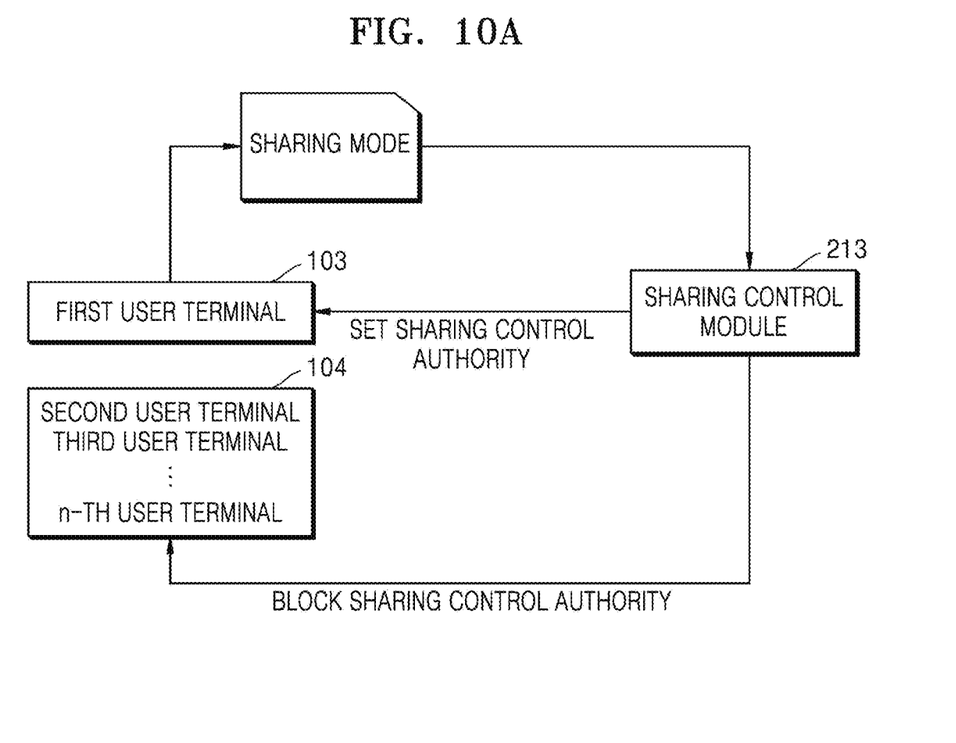
FIGS. 10A and 10B are views for describing a virtual space generation architecture provided to a plurality of user terminals when a sharing mode is executed by a virtual space tour system according to an embodiment.
Figure 10B:
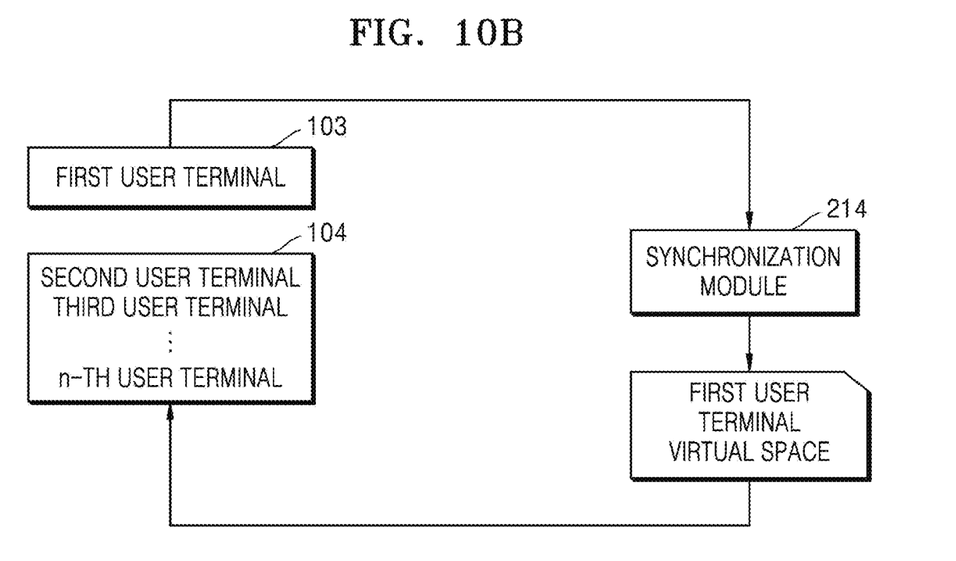
Figure 11A:
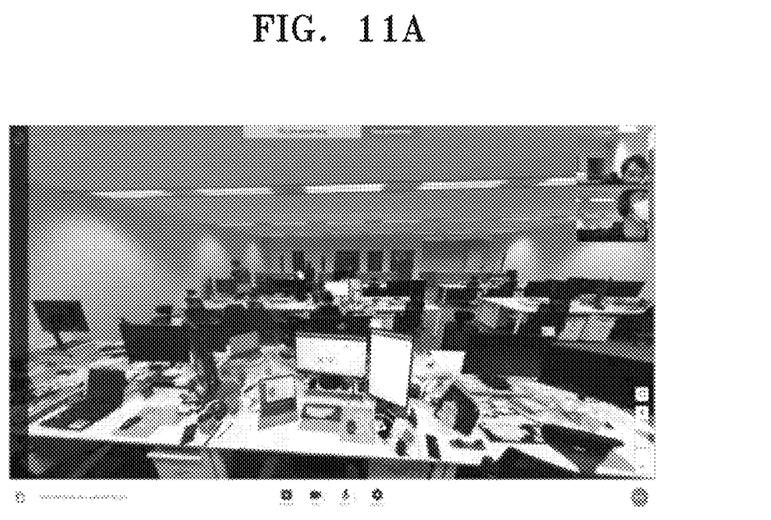
FIGS. 11A and 11B and FIGS. 12A and 12B are examples of views for describing a state before a sharing mode is executed and a state after the sharing mode is executed, according to an embodiment.
Figure 11B:
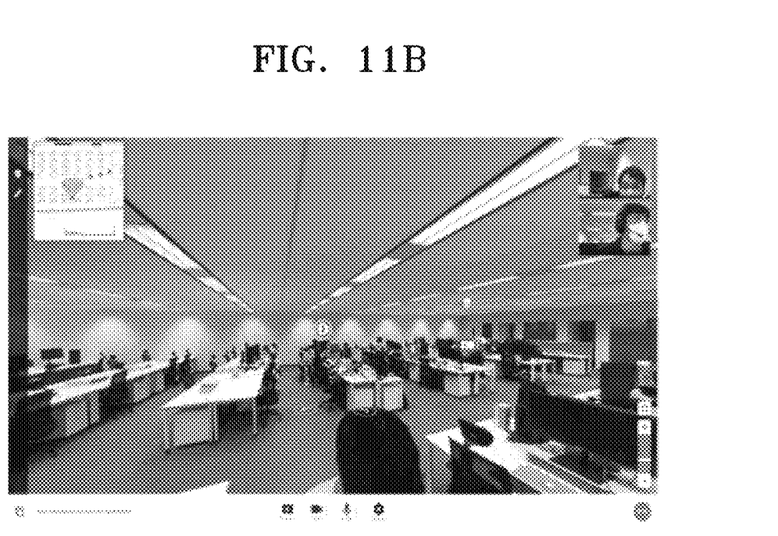
Figure 12A:
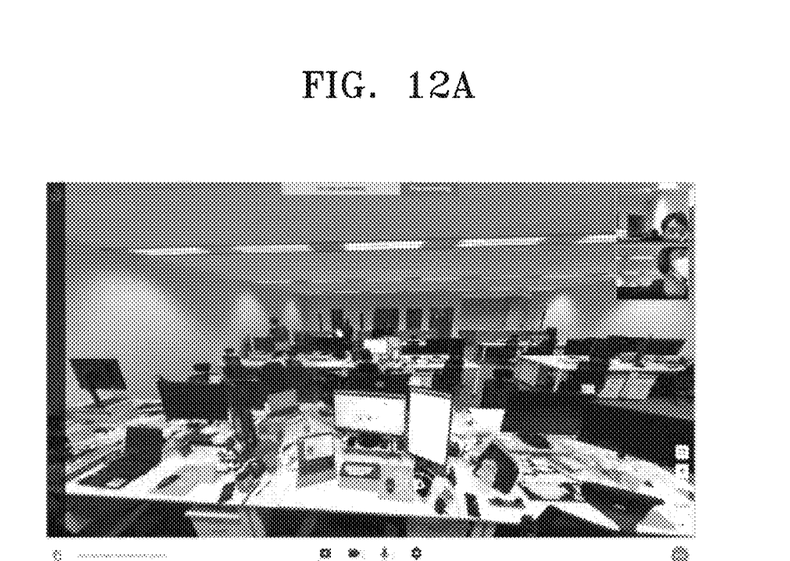
Figure 12B:
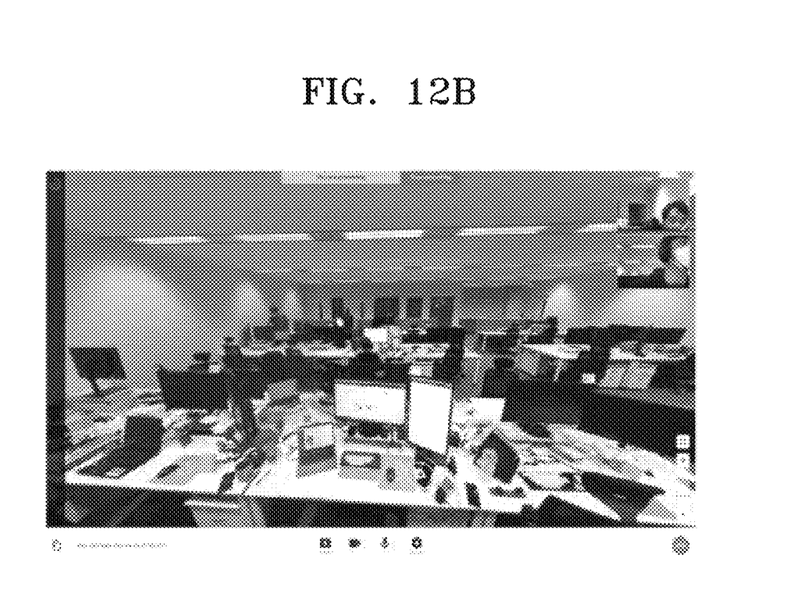

FIG. 10 is a view for describing a virtual space generation architecture provided to a plurality of user terminals when a sharing mode is executed by a virtual space tour system according to an embodiment.

Referring to FIG. 10, when a sharing mode is set for at least two user terminals, the sharing control module 213 may set a sharing control authority for the first user terminal 103 that is one of the at least two user terminals, and may block the sharing control authority for the second user terminal 104 that is the other one of the at least two user terminals.

When the sharing control authority is set, only the user terminal for which the sharing control authority is set, of the plurality of user terminals 100, may generate motion data for the virtual space provided to the plurality of user terminals 100.

Also, the synchronization module 214 may synchronize user tour information generated based on the motion data of the user terminal for which the sharing control authority is set, with the other user terminal of which the sharing control authority is blocked, and may output the result of synchronization on each screen.

The second user terminal 104 for which the sharing control authority is blocked, may receive the user's tour information from the first user terminal 103 for which the sharing control authority is set, and may execute object data included in the user's tour information, so that manipulation synchronized with manipulation at the first user terminal 103 may be performed at the second user terminal 104.

Here, the user tour information may include at least one sharing setting data of a sharing mode setting and a sharing authority setting and object data including at least one motion object.

As for the sharing setting data, when any one user terminal among the plurality of user terminals 100 generates and provides sharing mode setting motion data to the server 200, the other user terminals 100 may block motion data generation.

The user terminal for which the sharing mode is set, may generate a plurality of pieces of motion data and may provide the plurality of pieces of motion data to the server 200 to generate object data.

The server 200 may generate the user's tour information based on the object data and may provide the user's tour information in which the object data is included, to the other user terminals of which motion data generation is blocked.

The object data included in the user's tour information may be executed at the second user terminal 104 so that manipulation synchronized with the first user terminal 103 may be performed at the second user terminal 104.

FIGS. 11A and 11B and FIGS. 12A and 12B are examples of views for describing a state before a sharing mode is executed and a state after the sharing mode is executed, according to an embodiment.

Referring to FIGS. 11A and 11B and FIGS. 12A and 12B, the virtual space that is capable of being independently manipulated in each of the plurality of the user terminals 100, may be output on the screen.

When any one of two user terminals provides a sharing mode to the server 200, a sharing control authority may be set for the user terminal providing the sharing mode, and the sharing control authority for the other user terminal may be blocked, so that the virtual space of the user terminal providing the sharing mode may be output to the other user terminal.

In this case, motion data generation of the other user terminal of which the sharing control authority is blocked, may be blocked, and the user tour information generated based on the motion data generated in the user terminal providing the sharing mode may be output to the other user terminal of which the sharing control authority is blocked, so that manipulation synchronized with the user terminal providing the sharing mode may be provided to the other user terminal of which the sharing control authority is blocked.

According to the present application, there are one or more of the following effects.

According to an embodiment disclosed in the present application, the same virtual space may be provided to a plurality of user terminals, and the user may tour the virtual space according to each user's manipulation.

According to an embodiment disclosed in the present application, a virtual tour generated in any one user terminal may be provided to one or more other user terminals.

According to an embodiment disclosed in the present application, as for the virtual tour provided to one or more user terminals from any one user terminal, reproduction of the virtual tour, interruption, or manipulation during interruption may be performed according to each user's manipulation of one or more user terminals.

According to an embodiment disclosed in the present application, when the sharing mode is set in any one user terminal, the sharing control authority is blocked in the other one or more user terminals and the virtual tour manipulation is blocked at the same time, and as for the other one or more user terminals, the user may tour the virtual space according to the virtual space manipulation of the user terminal that has set the sharing mode.

Effects of the present application are not limited to the effects mentioned above, and other unmentioned effects will be clearly understood by those skilled in the art from the description of the claims.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims.

What is claimed is:

1. A system for providing a virtual space tour, the system comprising:
    a plurality of user terminals; and
    a server configured to provide a same virtual space corresponding to a real indoor space to the plurality of user terminals, to receive a plurality of pieces of motion data from the user terminals, to generate a plurality of motion objects corresponding to the plurality of pieces of motion data, and to generate user's tour information based on the plurality of motion objects,
    wherein the virtual space comprises 360-degree images provided at a plurality of points in the real indoor space, and
    the plurality of user terminals are configured to be independently operated in the virtual space at a same point or different points selected by each user among the plurality of points based on the virtual space, and individually generate motion data in response to manipulation of a viewing range and direction at each point selected by the each user.

2. The system of claim 1,
    wherein the motion data comprises at least one of a starting point, an ending point, a sharing mode, and manipulation data, which are received from the plurality of user terminals.

3. The system of claim 1,
    wherein the server is further configured to;
    generate a plurality of motion objects corresponding to a plurality of pieces of motion data received from the first user terminal,
    generate first tour information on a first user including the plurality of motion objects, and
    provide the first tour information to a second user terminal, and the second user terminal is configured to execute the plurality of motion objects included in the first tour information so that a virtual space tour corresponding to the first user's manipulation is provided to the second user terminal.

4. The system of claim 3,
    wherein the second user terminal is configured to provide at least one function among execution of the plurality of motion objects, interruption during execution, image manipulation at an interruption point, and tour reproduction after interruption.

5. The system of claim 2,
wherein, when the sharing mode is set for at least two user terminals, the server is configured to set a sharing control authority for a first user terminal that is one of the at least two user terminals and blocks the sharing control authority for a second user terminal that is the other one of the at least two user terminals.

6. The system of claim 5,
wherein the user's tour information comprises:
sharing setting data on at least one of a sharing mode setting and a sharing authority setting; and
object data including at least one motion object.

7. The system of claim 6,
wherein the server is further configured to receive the plurality of motion data generated by the first user terminal for which the sharing control authority is set to generate a plurality of motion objects, and generate user's tour information including the plurality of motion objects to provide the generated user's tour information to the second user terminal, and
the second user terminal is further configured to execute the user's tour information so that a virtual space tour synchronized with manipulation by the first user terminal is provided.

8. The system of claim 7,
wherein the second user terminal of which the sharing control authority is blocked is configured to receive the user's tour information from the first user terminal for which the sharing control authority is set, and executes the object data included in the user's tour information so that manipulation synchronized with manipulation at the first user terminal is performed at the second user terminal, and
a virtual space tour at the first user terminal is performed at the second user terminal.

9. A method of providing a virtual space tour, the method being performed by a server and comprising:
providing a same virtual space corresponding to a real indoor space to a plurality of user terminals;
receiving a plurality of pieces of motion data from a user terminal;
generating a plurality of motion objects corresponding to the plurality of motion data; and
generating user's tour information based on the plurality of motion objects,
wherein the virtual space comprises 360-degree images provided at a plurality of points in the real indoor space, and
the plurality of user terminals are configured to be independently operated in the virtual space at a same point or different points selected by each user among the plurality of points based on the virtual space, and individually generate motion data in response to manipulation of a viewing range and direction at each point selected by the each user.

10. The method of claim 9,
wherein the motion data comprises at least one of a starting point, an ending point, a sharing mode, and manipulation data received from the plurality of user terminals.

11. The method of claim 9, further comprising:
generating a plurality of motion objects corresponding to a plurality of pieces of motion data received from a first user terminal;
generating first tour information on a first user including the plurality of motion objects; and
providing the first tour information to a second user terminal and executing the plurality of motion objects included in the first tour information by using the second user terminal so that a virtual tour corresponding to manipulation of the first user is provided to the second user terminal.

12. The method of claim 11,
wherein the second user terminal is configured to provide at least one function of execution of the plurality of motion objects, interruption during execution, image manipulation at an interruption point, and tour reproduction after interruption.

13. The method of claim 10, further comprising:
when a sharing mode is set for at least two user terminals, setting a sharing control authority for a first user terminal that is one of the at least two user terminals; and
blocking a sharing control authority for a second user terminal that is the other one of the at least two user terminals.

14. The method of claim 13,
wherein the user's tour information comprises:
sharing setting data for at least one of a sharing mode setting and a sharing authority setting; and
object data including at least one motion object.

15. The method of claim 14, further comprising:
receiving a plurality of pieces of motion data generated by the first user terminal for which the sharing control authority is set, to generate a plurality of motion objects;
generating user's tour information including the plurality of motion objects to provide the user's tour information to the second user terminal; and
executing the user's tour information by using the second user terminal so that a virtual space tour synchronized with manipulation by the first user terminal is provided.

16. The method of claim 15, further comprising:
receiving the user's tour information from the first user terminal for which the sharing control authority is set by using the second user terminal of which the sharing control authority is blocked, and executing the object data included in the user's tour information so that manipulation synchronized with manipulation at the first user terminal is performed at the second user terminal, and
executing a virtual space tour at the second user terminal by manipulation at the first user terminal.

17. A non-transitory computer-readable storage medium on which computer-readable instructions are stored,
wherein, when a server is operated by a system for providing an omnidirectional image, the instructions allow the server to perform operations of:
providing a same virtual space corresponding to a real indoor space to a plurality of user terminals;
receiving a plurality of pieces of motion data from the plurality of user terminals;
generating a plurality of motion objects corresponding to the plurality of motion data; and
generating user's tour information based on the plurality of motion objects,
wherein the virtual space comprises 360-degree images provided at a plurality of points in the real indoor space, and
the plurality of user terminals are configured to be independently operated in the virtual space at a same point or different points selected by each user among the plurality of points based on the virtual space, and individually generate motion data in response to manipulation of a viewing range and direction at each point selected by the each user.

\* \* \* \* \*